United States Patent [19]

Mayers et al.

[11] 4,096,032
[45] Jun. 20, 1978

[54] MODULAR IN-CORE FLOW FILTER FOR A NUCLEAR REACTOR

[75] Inventors: Joseph B. Mayers, Greensburg; Walter E. Desmarchais, Monroeville; John M. Shallenberger, Pittsburgh, all of Pa.

[73] Assignee: Westinghouse Electric Corp., Pittsburgh, Pa.

[21] Appl. No.: 715,734

[22] Filed: Aug. 19, 1976

Related U.S. Application Data

[63] Continuation of Ser. No. 471,736, May 20, 1974, abandoned.

[51] Int. Cl.² ............................................. G21C 9/00
[52] U.S. Cl. ............................................. 176/38; 176/87
[58] Field of Search ............... 176/87, 68, 37, 38, 176/19 R; 137/547, 550

[56] References Cited

U.S. PATENT DOCUMENTS 3,383,287   5/1968   Jackson .......................... 176/40

*Primary Examiner*—Stephen C. Bentley
*Assistant Examiner*—Ralph Palo
*Attorney, Agent, or Firm*—J. R. Campbell; Z. L. Dermer

[57] ABSTRACT

A modular in-core flow filter for capturing potentially harmful debris during cold hydrostatic and hot functional testing of a nuclear reactor. Since testing is carried out before fuel assemblies are placed in the reactor, multiple filters, each being of the same size and configuration, are temporarily installed on the reactor lower core plate. They fill the space which later is occupied by fuel assemblies when the assemblies are installed in an operating position. Each filter includes a square metal base having a single axial opening which desirably covers four holes in the core plate. Fine mesh and coarse mesh screens are secured in the axial opening and the unit is removably attached to the core plate by brackets which extend through the metal base and engage the underside of the core plate but are actuated into position from the upper side of the core plate. When functional flow testing of the primary coolant system has been completed, the filters are removed for subsequent use in other reactors. Any debris caught by the screens and in the bottom of the presssure vessel is removed and the fuel assemblies are then loaded into the reactor.

6 Claims, 4 Drawing Figures

MODULAR IN-CORE FLOW FILTER FOR A NUCLEAR REACTOR

This is a continuation of application Ser. No. 471,736 filed May 20, 1974, now abandoned.

BACKGROUND OF THE INVENTION

The invention described herein relates to nuclear reactors and particularly to a filter used for removing debris from the reactor and primary loops during cold hydrostatic and hot functional testing.

During manufacture and subsequent installation of components comprising a nuclear reactor coolant circulation system, diligent effort is made to help assure removal of all debris from the reactor vessel and its associated systems which circulate coolant therethrough under various operating conditions. Conventionally, the debris is removed during cold hydrostatic and hot functionl testing which is performed to verify the correct functioning and structural adequacy of the primary coolant system and reactor core support structure before loading of the actual fuel assemblies and control rods in the pressure vessel.

This debris in the form of metal chips and shavings, small solid sections of metal, and the like, comprises the residue of machining, welding and fitting operations performed during the time the reactor vessel and associated systems are being manufactured and assembled into an operable plant. Although elaborate procedures are carried out to help assure debris removal, experience shows that in spite of the safeguards used to effect such removal, some chips and metal particles still remain hidden in the systems.

Different methods are used for effecting such debris removal. In small reactors, a single assembly of screens of the proper strength and characteristics is placed over the coolant inlet to the reactor core. As coolant is circulated through the reactor vessel during testing, such foreign matter which may reside in the system are caught by the screens and then later removed when the testing phase has been completed. Although single assembly screens are effective for small reactors, they cannot be used with large reactors because constant flow forces imposed on the screens are so large that the screen elements fracture and screen particles then circulate in the system. In other methods, no screens are used since the geometry of the steam generator and bottom of the reactor pressure vessel serves as a catch basin for such particles which also are removed after functional testing. However, small particles which may remain in the system can cause malfunction of operating parts if lodged between control rods and a guide tube, for example, or in the operating components of a pump.

SUMMARY OF THE INVENTION

Briefly stated, the above disadvantages of the prior art are eliminated by this invention by providing multiple in-core flow filters of modular construction which are placed over the coolant flow openings in the lower core plate during hot and cold functional testing. Each filter includes a metal base having an axial opening which contains at least one screen of a mesh sufficient to capture the smallest reasonable particle which would adversely affect the operation of movable parts in the reactor. A clamping mechanism on each filter acts to positively lock the filter on the core plate and thus preclude its displacement during testing but is still removable for subsequent use after the testing process has been completed.

It therefore is an object of the invention to provide a filter capable of being removably attached to the reactor lower core plate for capturing debris remaining in the reactor vessel and its associated systems after assembly and installation.

Another object of the invention is to provide a filter assembly of modular construction which is reusable and transportable from one plant site to another.

BRIEF DESCRIPTION OF THE DRAWINGS

While the specification concludes with claims particularly pointing out and distinctly claiming the subject matter of the invention, it is believed the invention will be better understood from the following description taken in connection with accompanying drawing wherein:

Figure 1:
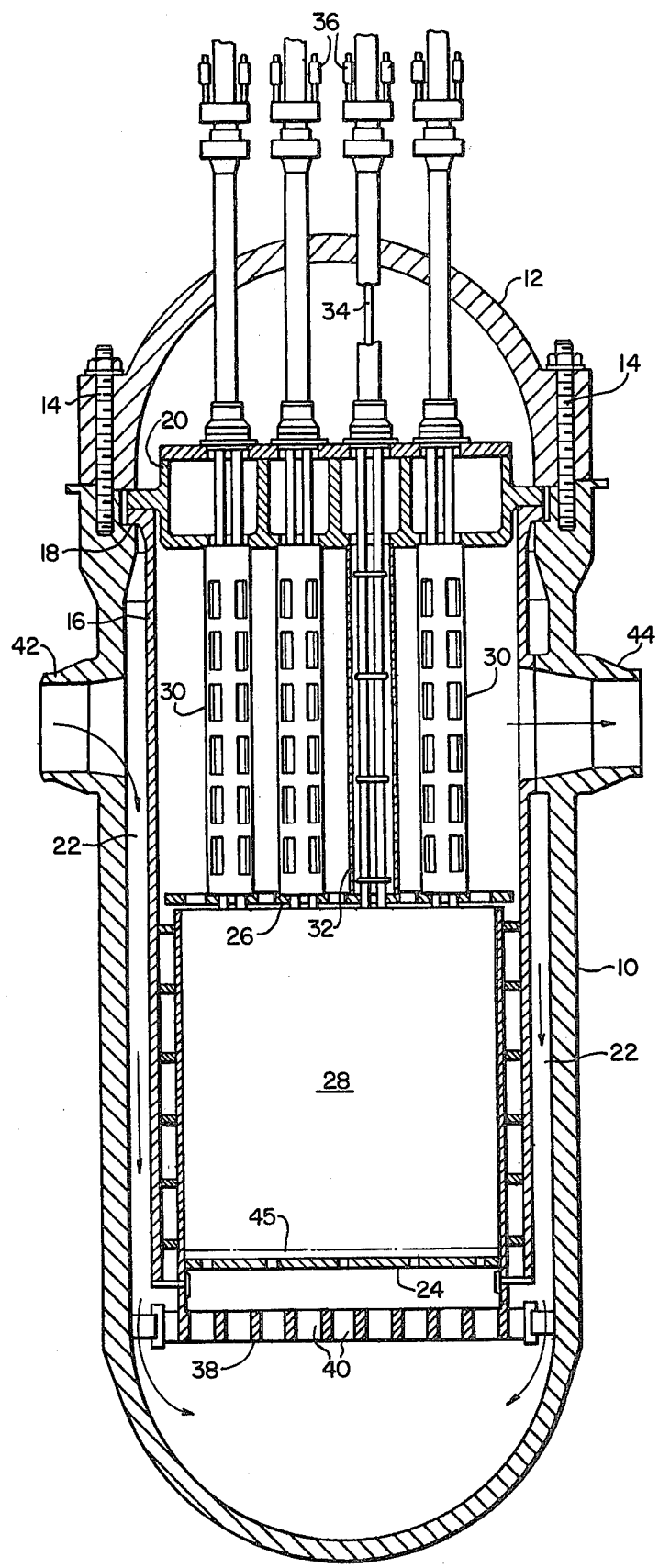
FIG. 1 is a general view of the nuclear reactor without fuel assemblies, but including the disposition of filters on the reactor lower core plate.
Figure 2:
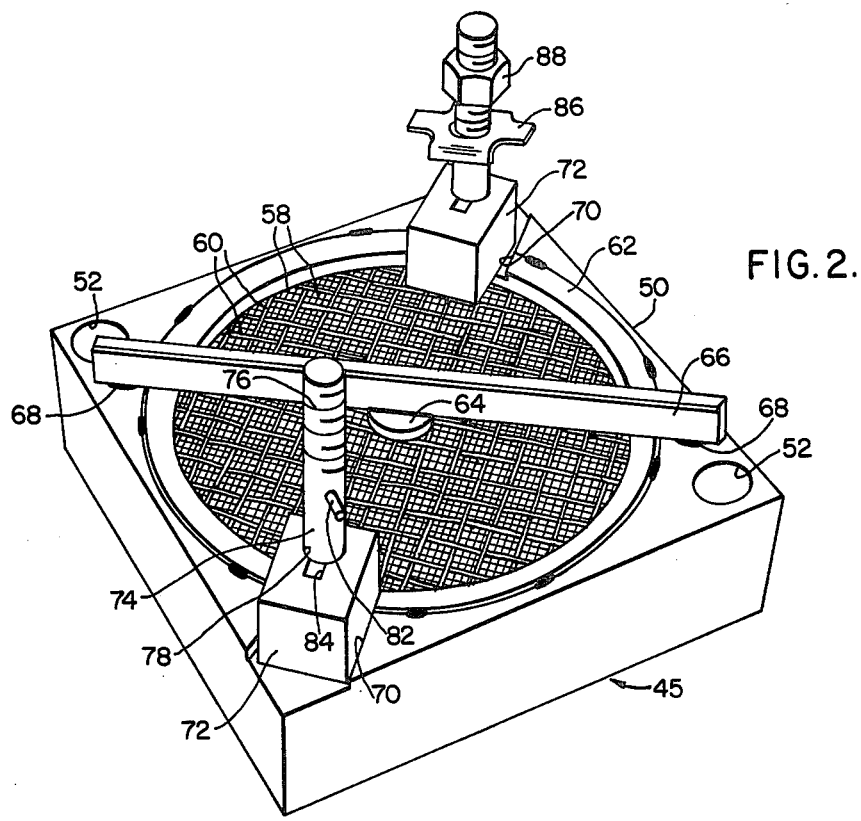
FIG. 2 is an isometric view shown the top portion of a filter assembly.

Referring now to the drawings wherein like reference characters designate like or corresponding parts throughout the several views, there is shown in FIG. 1 a general outline of a nuclear reactor including a pressure vessel 10 having a head 12 secured in fluid tight relationship therewith by bolts 14. A core barrel 16 suspended from a ledge 18 and held in place by an upper structure 20 is spaced from the pressure vessel walls to provide the annular space 22 extending substantially the full length of the pressure vessel. A lower core plate 24 and an upper core plate 26 are secured to the core barrel and the area 28 defined by the core plates is designed to contain the fuel assemblies, not shown, which comprise the core of the reactor after it is placed in operation. The space between the upper structure 20 and the upper core plate 26 contains support adapters 30, and control rod guide tubes 32 house control rods 34 which are reciprocally driven in the fuel assemblies by control rod drive mechanisms 36. The bottom of the reactor vessel includes the lower support plate 38 having openings 40 therein. Coolant is introduced into the reactor through inlet 42 and flows downwardly through the annular space 22 into the bottom of the pressure vessel 10. Its flow direction is then reversed and the coolant then flows upwardly through openings 40, lower core plate 24 and the fuel assemblies when installed in position, prior to being discharged through outlet 44 and into a primary loop which conventionally includes a pump and steam generator, not shown. The above-described structure is well known in the art and is shown herein to help illustrate the invention.

As indicated above, the modular in-core flow filter is used for catching debris and preventing its circulation through the reactor primary loop systems during the time that cold hydrostatic and hot functional testing of the reactor coolant system takes place. Such testing is carried out before the fuel assemblies are loaded into the reactor.

The lower core plate 24 covers substantially the complete area inside the internals assembly and is equipped with multiple holes or openings through which the coolant flows upwardly into heat exchange relationship with the fuel rods in each fuel assembly in the reactor.

Figure 4:
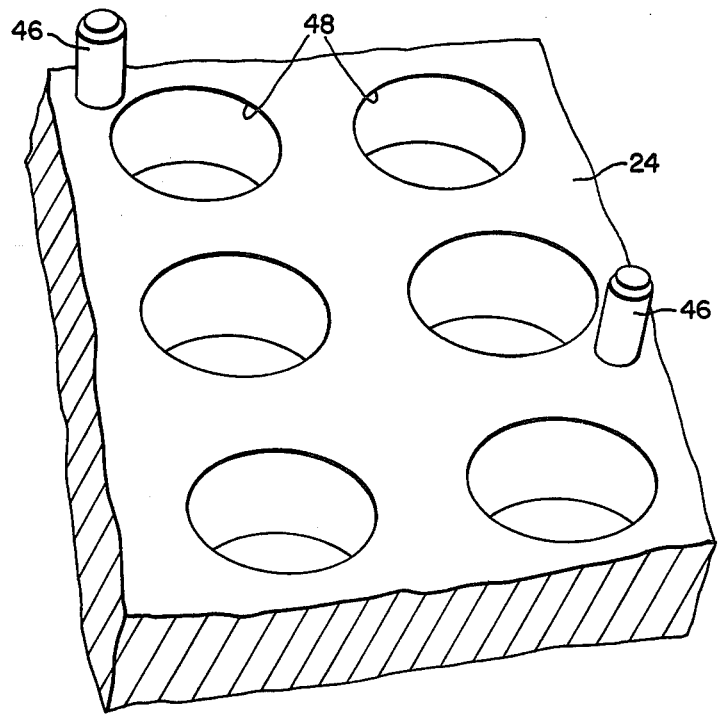
FIG. 4 illustrates the design of a section of a lower core plate used in a nuclear reactor.

FIG. 4 represents a section cut out of the lower core plate 24 and is of a size substantially the same as that of a fuel assembly. As shown, conventional dowel pins 46 are located in a position to accept and center a fuel assembly and four openings 48 therefore appear below the fuel assembly and through which coolant flows upwardly into contact with the fuel assemblies for carrying away the generated heat.

Figure 3:
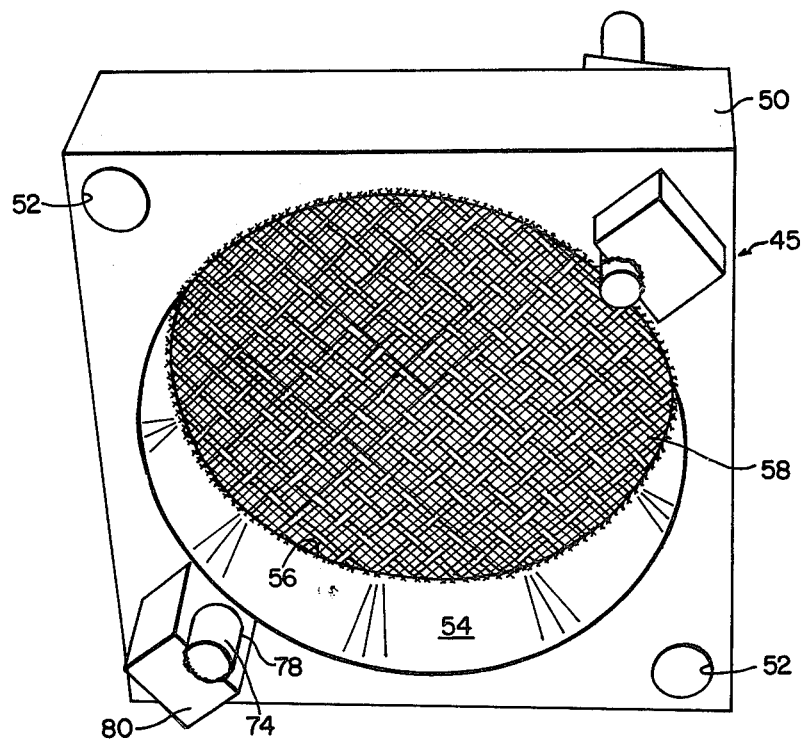
FIG. 3 is an isometric view showing the bottom portion of the filter assembly.

FIGS. 3 and 4 respectively illustrate the top and bottom views of a filter which is designed to be placed on the lower core plate for filtering purposes. Only one is shown but it will be understood that multiple filters are used and that each filter covers substantially the same area that a fuel assembly covers when it is placed in the reactor. The filter must meet certain design requirements in order to be effective in carrying out a filtering function. The filter assembly must be capable of attachment to the reactor lower core plate prior to hydrostatic testing and removal after hot functional testing without requiring dissassembly or removal of any components in the lower part of the reactor vessel. It must be capable of restraining the flow of all particles equal to, and larger than a spherical body 1/16 in. in diameter and of withstanding the forces expected to be imposed on the filter elements by coolant flowing through the reactor vessel at its highest pressure and velocity. The design must be sufficiently strong to stop water borne missiles as large as $\frac{1}{4}$ to $\frac{1}{2}$ inch in diameter and the total flow pressure drop caused by the multiple flow screen assemblies shall not exceed that of an installed core. Importantly, the filter assemblies must be reusable and transportable from one plant site to another in order to effect economy in operation.

Each filter assembly of the type illustrated in FIGS. 3 and 4 meets the above cited parameters. It is approximately eight inches square and 2$\frac{1}{2}$ inches high, this height of the assembly being established by the need to clear the various bolts, nuts, and instrumentation guides which protrude above the top surface of the lower core plate. Each filter encompasses an area equivalent to that of the plan view area of a fuel assembly and includes axial holes 52 into which the two pins 46 on the core plate project. This arrangement serves to accurately orient the filter assembly as they do a fuel assembly when it later is placed in the reactor prior to operation. The filter body has an axial opening 54 (FIG. 3) extending therethrough and includes a flange 56 located adjacent the top surface. A filter element comprising 300 series stainless steel square mesh woven wire screen 58 is placed on the flange and a backing screen 60 which provides mechanical support for the filter screen, and made of the same material, is positioned in the opening and in contact with the filter screen. The width of the mesh openings in the filter screen 58 are 0.0603 inches and the wire diameter is 0.023 inches thus providing a resultant open flow area for the screen of 52% which is adequate for testing purposes. The backing screen 60 has larger openings which measure 0.375 inches in width and a wire diameter of 0.080 inches. As shown, the screens are recessed into the top surface of the filter assembly body and are held in firm contact with the flange by a split retainer ring 62 which is welded to the base 50.

To provide support in the central portion of the filter, a circular disc 64 welded to the underside of a steel bar 66 just engages the top surface of the backing screen 60 and serves to limit the screen deflection in the coolant flow direction. The steel support bar 66 is welded to the top surface of the filter base 50 as indicated at 68. In order to position the filter assembly on the lower core plate, the filter base is provided with radial recessed slots 70 into which metal blocks 72 are adapted to fit. A shaft 74 having threads 76 extends downwardly through hole 78 in the metal base and projects beyond the lower surface thereof. A lug 80 welded to the end of the shaft projecting below the lower surface of the filter assembly is of a size sufficient to be rotated over a corresponding part of the lower core plate to just lock the filter assembly in position on the core plate. A dowel pin 82 secured to and extending through each shaft serves to prevent the shaft from falling through the filter assembly. Further, a slot 84 provided in each metal base is of a size to receive the dowel pin 82 and the dowel pin serves the further function of aligning the offset lug on the bottom of the shaft with the underside of the core plate.

In assembling the filter assembly, after the screens and retaining rings 62 have been set in position and the bar 66 welded to the top surface of the base 50, metal blocks 72 are set into their recesses 70 and the shaft 74 inserted through openings 78 in the block and the base of the filter assembly. With the parts in this position, the shaft 74 is rotated to bring the offset lug 80 into a position underlying the core plate and at that time the dowel pin 82 will be in alignment with and fall into the slot 82 provided in block 72. A locking tab 86 and nut 88 is then rotated onto the shaft 74 to thus draw the offset lug beneath the plate and thereby firmly secure the filter assembly to the core plate 24.

Since each filter assembly encompasses or covers only four holes in the lower core plate, it will be apparent that the multitude of filter assemblies will be provided for each sequence of four holes to provide for a complete filtering apparatus during the cold hydrostatic and hot functional testing phases. Since the lower core plate will be provided with one or more manway covers which provide access to the lower portions of the pressure vessel, slightly modified filter assemblies must be used in those areas. This merely requires making the shafts of a longer length since the thickness of the core plate at the manhole opening is greater than that of the main body of the core plate itself.

In those cases where greater flow through the filters in excess of that provided by these filters is required, the screens may be made of a conical or parabolic configuration for example. These kinds of designs will furnish a greater through-flow area, thus permitting the filters to handle a larger volume of coolant which is circulated during the reactor coolant system testing phases.

In view of the above it will be apparent that many modifications and variations are possible in light of the above teachings. It therefore is to be understood that within the scope of the appended claims, the invention may be practiced other than as specifically described.

We claim:

1. A system of removing potentially harmful debris from a nuclear reactor coolant circulation system before loading the reactor with fuel assemblies and during preoperational testing comprising:
   a pressure vessel having a head secured in fluid tight relationship therewith,
   a coolant inlet and outlet in said vessel for accommodating flow of coolant therethrough, spaced upper and lower core plates having coolant flow openings therein attached to support members in the pressure vessel, said upper and lower core plates providing an empty space therebetween otherwise occupied by said fuel assemblies, an upper structure mounted near the top of said pressure vessel and control rod guide tubes and support adapters mounted between the upper structure and said upper core plate; and multiple filter assemblies mounted on and covering the openings in said lower core plate, each of said filter assemblies including a base having filter elements in at least one coolant flow opening therein, the arrangement being such that the filter assembly opening is aligned with the lower core plate openings when each assembly is placed thereon, locking means on each of said assemblies which coact with said lower core plate and removably attaches each filter assembly to said core plate, whereby said filter assemblies prevent the flow of metal chips and shavings past the filter elements into the reactor coolant system when a flushing liquid is circulated through the reactor during preoperational testing.

2. The system according to claim 1 wherein spaced fuel assembly dowel pins are fixed on said lower core plate, and at least one dowel pin opening in each filter assembly which receives one of said dowel pins when the filter assemblies are placed on the lower core plate.

3. The system according to claim 1 wherein said locking means includes a member which extends through said openings in the lower core plate and engages the bottom surface of said lower core plate to hold said filter assembly in position.

4. The system according to claim 1 wherein said filter elements include a filter screen and a backing screen therefor, said backing screen having a mesh larger than said filter screen, a retainer ring on said base for holding said screens in position; and a transversely extending bar having a portion in engagement with said backing screen secured to the upper surface of said base for imparting additional strength to said screen.

5. The system according to claim 1 wherein said locking means includes a shaft which extends through an opening in said lower core plate, said shaft having an offset lug on one end thereof and the other end being of a length sufficient to extend above said filter assembly base, the arrangement being such that manual rotation of the shaft moves the offset lug into engagement with the bottom surface of said core plate; and a tightening member on said other end which is actuated to draw said offset lug upwardly into engagement with the lower core plate and thereby lock the assembly in position.

6. The system according to claim 5 wherein said shaft extends through a block mounted on the upper portion of said base;

a slot on said base which projects into the opening through which the shaft extends; and a pin projecting outwardly from said shaft and mounted perpendicular to the shaft axis, said pin being in direct alignment with the offset lug on the bottom of the shaft, so that when the shaft is rotated and the pin placed in said slot, an operator is assured that the offset lug is in a locking position beneath said core plate.

* * * * *